No. 743,086. PATENTED NOV. 3, 1903.
J. KAHN.
COMPOSITE STRUCTURAL MEMBER.
APPLICATION FILED MAY 4, 1903.
NO MODEL. 2 SHEETS—SHEET 1.
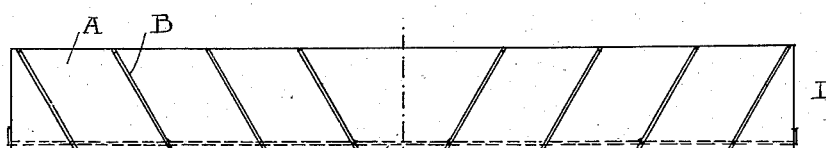
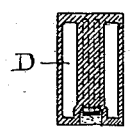
Fig. 1. Fig. 2.
Fig. 3.
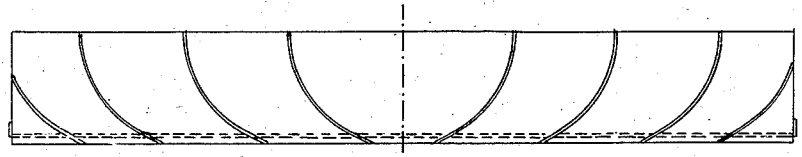
Fig. 4. Fig. 5.
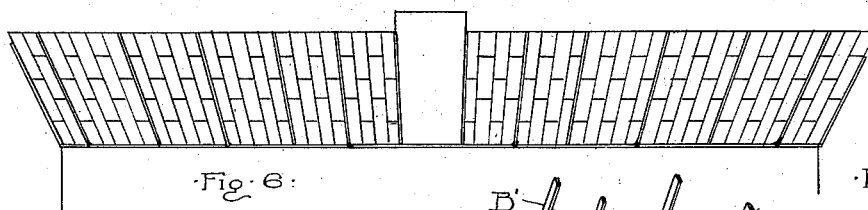
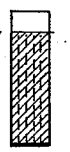
Fig. 6. Fig. 7.
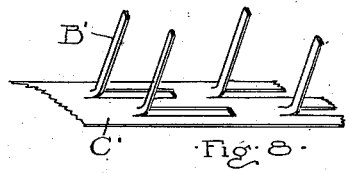
Fig. 8.
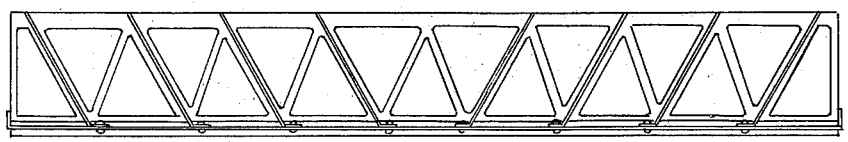
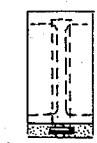
Fig. 9. Fig. 10.
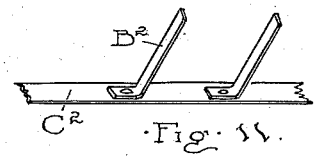
Fig. 11.
WITNESSES. INVENTOR.
JULIUS KAHN.
BY
Attorney No. 743,086. PATENTED NOV. 3, 1903.
J. KAHN.
COMPOSITE STRUCTURAL MEMBER.
APPLICATION FILED MAY 4, 1903.
NO MODEL. 2 SHEETS—SHEET 2.
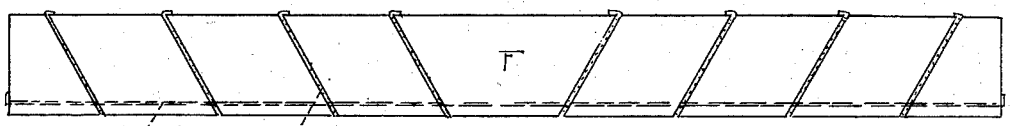
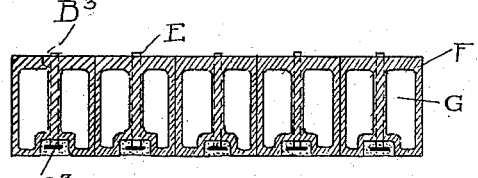
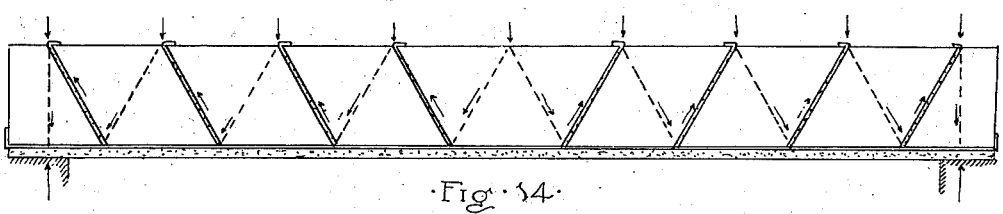
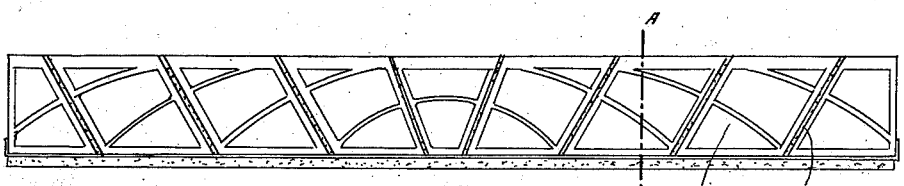
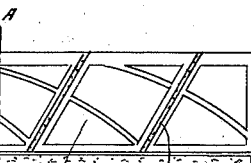
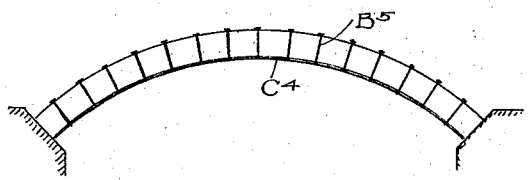
WITNESSES.
INVENTOR.
JULIUS KAHN
BY
Attorney.

No. 743,086.

Patented November 3, 1903.

UNITED STATES PATENT OFFICE.

JULIUS KAHN, OF DETROIT, MICHIGAN.

COMPOSITE STRUCTURAL MEMBER.

SPECIFICATION forming part of Letters Patent No. 743,086, dated November 3, 1903.

Application filed May 4, 1903. Serial No. 155,677. (No model.)

*To all whom it may concern:*

Be it known that I, JULIUS KAHN, a citizen of the United States, residing at Detroit, in the county of Wayne and State of Michigan, have invented certain new and useful Improvements in Composite Structural Members, of which the following is a specification, reference being had therein to the accompanying drawings.

The invention relates to composite structural members, and has for its primary object the obtaining of a construction in which a suitable body material capable of resisting compression stresses is strengthened and trussed by one or more metallic members.

It is a further object to obtain the maximum strength with a minimum amount of material, and, further, to obtain a construction which is inexpensive to manufacture and may be quickly erected into position for use.

The invention consists in the peculiar construction and arrangement of a metallic member within the body; further, in a construction in which the reinforced body is formed in a plurality of sections and the metallic member is arranged to extend between said sections, and, further, in the peculiar construction and arrangement of parts, as hereinafter set forth.

In the drawings, Figure 1 is a side elevation, and Fig. 2 is a cross-section, of a beam constructed in accordance with my invention. Fig. 3 is a perspective view of the metallic member employed. Figs. 4 and 5 are views similar to Figs. 1 and 2, showing modified constructions. Figs. 6, 7, and 8 are similar to Figs. 1, 2, and 3 and illustrate a construction of window-lintel. Figs. 9, 10, and 11 illustrate another modification in construction of beam. Figs. 12 and 13 illustrate a floor-construction. Fig. 14 is a diagram illustrating how the stresses are carried through the metal and blocks, the arrows indicating direction of stress. Figs. 15, 16, and 17 illustrate still other modifications, Fig. 16 being a section of Fig. 15 on line A A.

The feature of construction common to all of the modifications illustrated is that the metallic strengthening member is constructed and arranged to form one portion of a truss, the remaining constituents of which are formed by the body material. The body material may be formed either of a cementitious substance or of tile, terra-cotta, wood, cast-iron, burnt clay, or any suitable substance that is capable of resisting compression stresses. The metallic members C comprise a portion extending longitudinally of the body and a plurality of arms B, rigidly secured to said longitudinal portion and extending transversely through the body in such a manner as to be transverse to the direction of the compression stresses developed in said body when under load. These arms also extend in lines of tension stress, and thus the double function is performed: first, that said arms are rigidly clamped in position within said body by the compression stresses, and, second, that the tension stresses are carried by said arms cumulatively into said longitudinal member.

Another feature of construction which is common to the various modifications illustrated is that the body is formed of a plurality of separate blocks or sections and that the strengthening member is arranged to have its arms extend between said sections. The object of this construction is that the blocks or sections of the body may be previously prepared, thus avoiding the delay which is necessary where the metallic members are embedded in a plastic body of material, such as concrete. It further lessens the work of construction in dispensing with boxing and centering. Still further, the blocks or sections thus prepared may be formed with the material arranged so that it lies in lines of actual stress, while in places where no stresses occur the blocks may be hollowed out, as shown by G, thereby reducing the dead-weight of the structure.

In the construction shown in Figs. 1 and 2 the beam is formed of a plurality of sections A, between which are arranged the arms B of the metallic strengthening member C. (Illustrated in Fig. 3.) As shown, these arms are struck up from a portion of the longitudinal part of said metallic member and are rigidly attached at one end to said longitudinal member. The blocks or sections A are preferably formed with grooves in their lower edges, in which the longitudinal member C lies. The grooves are then filled with cement, which embeds the member, and cement is also placed in the joints between the sections, thus firmly uniting the metallic member to the body.

To save material, the blocks A are preferably hollowed out at D upon opposite sides of the central web.

The construction shown in Figs. 4 and 5 is similar with the exception that the metallic arms are of the curved form shown, which is, in effect, a progressively-changing inclination, the object being that in this form the subordinate members correspond very closely to the lines of actual principal tensile stress.

Figs. 6 and 7 illustrate a flat-arch brick window-lintel. In this construction the metallic member $C'$ is employed and has a plurality of arms $B'$ struck up therefrom and arranged between the brick.

Figs. 9 and 10 show a beam wherein the blocks have web-ribs and the material within the blocks is arranged to lie in the actual lines of stress to form a quadrangular truss. The metallic member $C^2$ employed in connection with this construction has its arms $B^2$ rigidly secured thereto by riveting.

Figs. 12 and 13 illustrate a construction intended for use as a floor. In this a plurality of blocks are arranged side by side and are strengthened by the metallic members, as shown.

Fig. 14 illustrates how the stresses are carried through the metal and blocks. Thus for a uniformly-distributed load on top the blocks carry the weight to the lower end of the inclined metal members. The latter receiving the same are put in tension in carrying the weight to the top of the next block. This process is continued successively until the supports are reached. The main horizontal member being connected to the ends of all the inclined members receives their horizontal components, and thus forms the bottom chord of the truss.

In all the constructions thus far described the blocks are arranged to form a flat arch, and in such constructions internally-arched thrust-lines set themselves up within the block material to carry the stresses when loads are placed along the top, and to take care of these stresses without unnecessarily increasing the dead-weight a series of arched ribs H are arranged as shown in Fig. 15.

Metallic members $B^4$ are arranged between the inclined abutting faces of the several sections and, in connection with the longitudinal connecting member, form abutments for the various arches. Thus the structure as a whole forms a self-contained flat arch exerting no end thrust.

Although in the construction as shown the inclined metallic members are extended to the top of the beam, when loads are light this is not absolutely necessary, and in such cases said members may terminate at a distance above their insertion in the joint only sufficiently great to receive the actual stress.

In Fig. 17 a curved arch is illustrated in which the metallic member $C^4$ extends longitudinally along the lower face of the arch and the arms $B^5$ extend transversely between the joints of the blocks.

The subordinate or inclined members may of course be connected to the main members by any one of the methods which is generally in use, forming a riveted, hooked, bolted, or other rigid connection.

What I claim as my invention is—

1. A composite structural member comprising a body formed of a plurality of sections and capable of resisting compression stresses and a metallic strengthening member extending longitudinally of said body, having a plurality of arms extending transversely and arranged between the joints of said body-sections whereby the stresses developed within said body under load will be transferred to said arms.

2. The combination with a plurality of prepared blocks or complementary sections of a metallic strengthening member extending longitudinally thereof and a plurality of upright extending members rigidly attached to said longitudinal member at points intermediate the ends of the latter and projecting obliquely therefrom to form the carrying members of a part-truss, said laterally-extending members lying between the joints of said sections whereby the stresses are communicated from the sections into the metallic member.

3. The combination of a plurality of prepared blocks having inclined meeting faces, of a metallic member comprising a longitudinally-extending bar and a plurality of arms rigidly secured to said bar extending between the inclined meeting faces of said blocks.

4. A window-lintel comprising a body formed of a plurality of sections for resisting compression stresses and a metallic strengthening member therefor consisting of a bar extending longitudinally beneath said sections and having a plurality of arms rigidly secured thereto intermediate its ends, said arms extending upward between the joints of said sections.

5. A window-lintel consisting of a body for resisting compression stresses and a metallic member extending longitudinally beneath said body, said metallic member being provided with a plurality of upwardly-extending arms rigidly secured thereto at points intermediate its ends and said arms projecting into said body for the purpose of receiving stresses therefrom and conveying them into said longitudinal member.

In testimony whereof I affix my signature in presence of two witnesses.

JULIUS KAHN.

Witnesses:
JAS. P. BARRY,
ROSA LEONA MORGAN.